June 16, 1936.　　　C. P. MICHENER　　　2,044,122
GAME
Filed Sept. 11, 1934　　　2 Sheets-Sheet 1

Inventor
C. P. Michener
By Clarence A. O'Brien
Attorney

June 16, 1936.  C. P. MICHENER  2,044,122
GAME
Filed Sept. 11, 1934   2 Sheets—Sheet 2
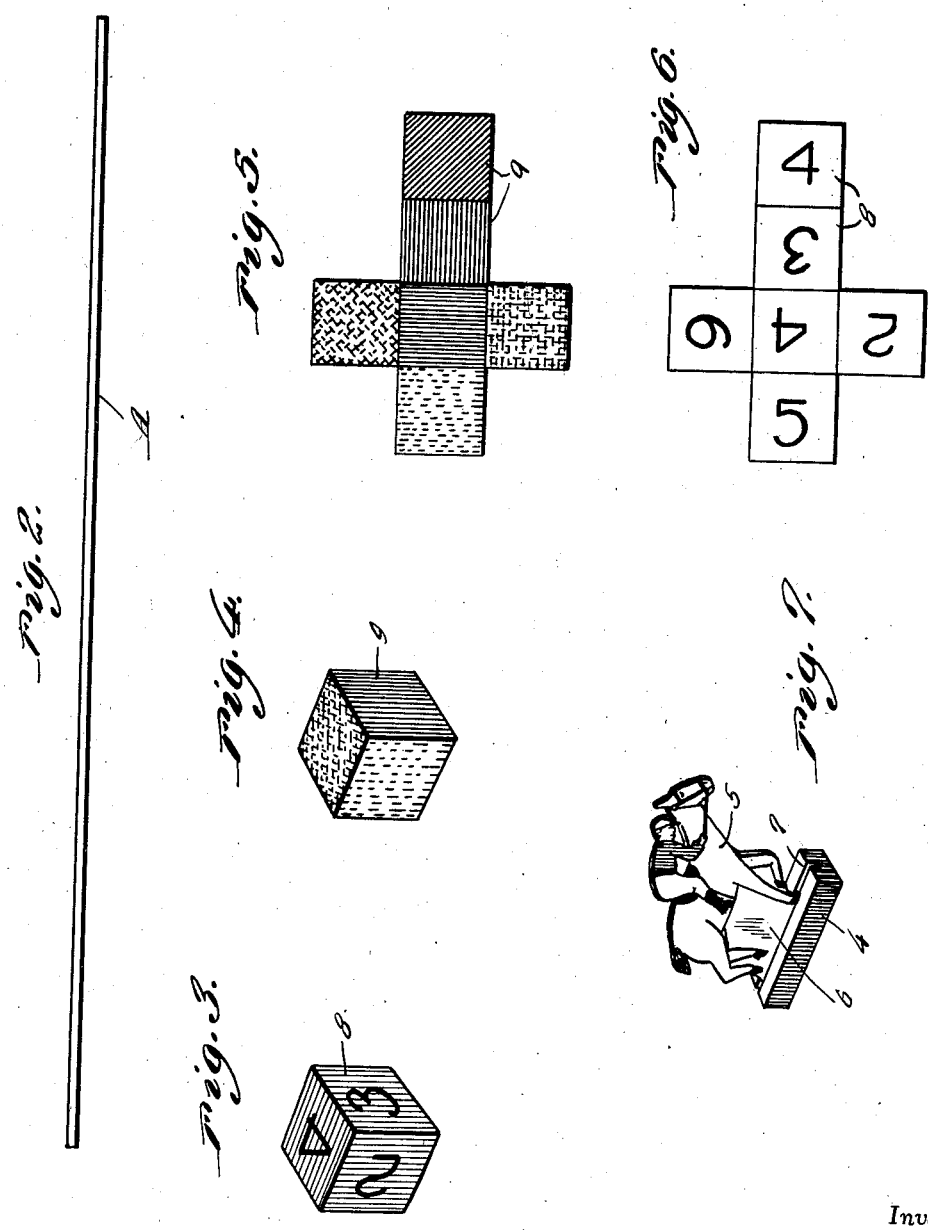
Inventor
C. P. Michener
By Clarence A. O'Brien
Attorney Patented June 16, 1936

2,044,122

UNITED STATES PATENT OFFICE 2,044,122

GAME

Charles P. Michener, Severna Park, Md.

Application September 11, 1934, Serial No. 743,578

2 Claims. (Cl. 273—134)

This invention relates to a game, the general object of the invention being to provide a board marked to indicate race courses and to provide playing pieces made to represent race horses with riders thereon and cubes or dice, the throw of which indicates how the playing pieces are to be moved on the board.

This invention also consists in certain other features of construction and in the combination and arrangement of several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Fig. 2 is an edge view thereof.

Fig. 3 is a view of one of the numbered cubes.

Fig. 4 is a view of one of the unnumbered cubes.

Fig. 5 is a view showing how the unnumbered cubes are colored.

Fig. 6 is a view showing how the numbered cubes are numbered.

Fig. 7 is a view of one of the playing pieces.

Figure 1:
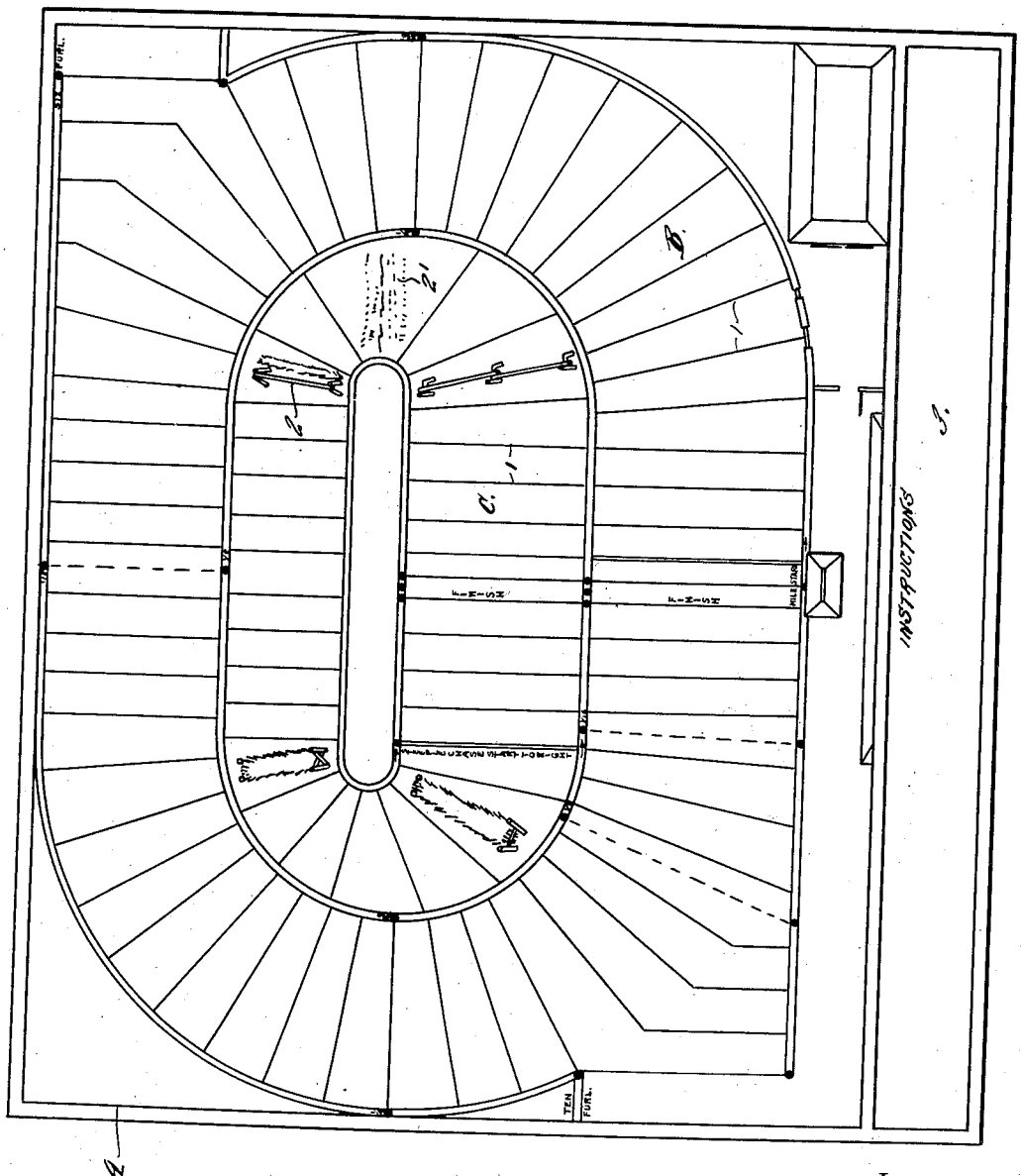
Fig. 1 is a top plan view of the board.

In these drawings, the letter A indicates the board upon the upper face of which is suitably marked the race tracks B and C, the track B enclosing the track C and each track being divided into blocks by the lines 1 and the track C has marked thereon barriers 2, some of which are shown as hedges, others as elevated cross pieces and another one as a water barrier as shown at 2'. Certain of the blocks between the lines 1 are marked to indicate distances and the finishing and starting lines and other indicia may be placed on the board to represent grandstands and other objects associated with a race course. A space 3 is also formed at one side of the board for receiving the instructions for playing the game.

The playing pieces are made to represent horses and their jockeys and as shown in Fig. 7, each playing piece comprises a base 4 and the representation of a horse and jockey as shown at 5 which is formed with a base part 6 for entering a groove 7 in the base. Each playing piece is colored as shown in Fig. 7 which indicates that the base and a portion of the garment of the jockey is of red color. Each playing piece is of a different color from the other playing pieces.

Twelve cubes 8 are used in this game, these twelve cubes having marked thereon the numerals 4—4—2—6—3—5. All of these twelve cubes are of different colors and each cube is colored the same as a playing piece.

The two unnumbered cubes 9 each has its six faces colored differently and the other unnumbered cube is colored with different colors from those used on the first unnumbered cube. Thus, these two unnumbered cubes give twelve different colors, six colors on each cube.

The game can be played in different ways and when an ordinary race is to be played, the playing pieces are placed in the space or block marked "Mile start". As many colored numbered cubes are used as there are horses entered in the race and the cubes should be in the same color as the horses and one or both unnumbered cubes may be used. The horses are moved the number of blocks or spaces indicated on the upturned similarly colored cubes. For instance, if the red cube has the numeral 4 uppermost, the red horse is moved four blocks, but when an unnumbered cube has its red side uppermost, the red horse is not moved. The horses are continued to be moved in accordance with the throw of the cubes until the finish line is reached and the horse first reaching the finish line of course wins the race. In a race, where the moves carry two or more horses to the finish line together, it is a race but if the moves or casts carry a horse beyond the finish line, he wins and the fartherest beyond the finish line wins if more than one are carried beyond the finish line.

When the steeplechase or jumping race track C is being used, the horses are placed on the line marked "Steeplechase start", disregarding the finish line the first time in passing. The colored numbered cubes are used as before and both unnumbered cubes. All of the cubes are thrown together and the horses moved in accordance with the numbers on the numbered cubes but when an unnumbered cube has a certain color uppermost, the horse bearing the same color when passing over or beyond an obstacle or barrier is removed from the race as this signifies failure of the horse to clear the obstacle or barrier or a fall and thus the horse is out of the race.

It is thought from the foregoing description that the advantages and novel features of the invention will be readily apparent.

It is to be understood that changes may be made in the construction and in the combination and arrangement of the several parts, provided that such changes fall within the scope of the appended claims.

I claim:

1. In combination with a game board and a colored playing piece movable thereover, a chance device for controlling the movement of said playing piece comprising a cube having all the faces thereof identically colored to correspond with the color of the game piece and having on each face thereof indicia indicating the distance which the playing piece is to be moved over the board, an un-numbered cube, each face thereof having a different color and one face thereof having a color similar to the color of the numbered cube, whereby when the numbered and un-numbered cubes are simultaneously rolled, the distance indicated on the upturned face of the colored numbered cube may be voided by the upturning of the correspondingly colored face of the un-numbered cube.

2. For use with a game board and a colored playing piece movable thereover, a chance device for controlling the movement of said playing piece comprising a cube having all the faces thereof identically colored to correspond with the color of the game piece and having on each face thereof indicia indicating the distance which the playing piece is to be moved over the board, an un-numbered cube, each face thereof having a different color and one face thereof having a color similar to the color of the numbered cube, whereby when the numbered and un-numbered cubes are simultaneously rolled, the distance indicated on the upturned face of the colored numbered cube may be voided by the upturning of the correspondingly colored face of the un-numbered cube.

CHARLES P. MICHENER.